United States Patent Office 3,317,436
Patented May 2, 1967

3,317,436
LIQUID STABILIZERS FOR VINYL CHLORIDE POLYMERS COMPRISING A LEAD SALT DISSOLVED IN AN ALKYL PHENOL
Alfred Szczepanek, Duren-Rolsdorf, and Günter Koenen, Duren, Germany, assignors to Chemische Fabrik Hoesch K.-G., Duren, Germany
No Drawing. Filed Feb. 19, 1963, Ser. No. 259,741
Claims priority, application Germany, Feb. 26, 1962, C 26,335
9 Claims. (Cl. 252—400)

This invention relates to liquid lead stabilizers for vinyl chloride polymers and copolymers.

It is known to protect halogen-containing synthetic polymers, particularly polyvinyl chloride and its copolymers, from the action of heat and light by means of lead stablilizers.

The known lead stabilizers are primarily lead salts of inorganic or organic acids. Lead alkyl compounds have not found acceptance as stablilizers for high molecular weight polymers due to their high toxicity and their comparatively high cost.

The lead salts of inorganic or organic acids mentioned above are generally available in the form of powders or pastes. Lead salts of organic acids which are preferred are those of fatty acids because they act as lubricants in addition to being active stabilizers.

In general, serious dusting problems are associated with the use of lead stabilizers and special precautions have therefore to be taken when they are being used in order to prevent lead poisoning. To minimize these dusting problems, it is usual either to reduce the formation of dust by adding a few percent of a plasticizer to the pulverulent stabilizer or to convert the stabilizer into pasty form by means of suitable plasticizers.

Moistening with plasticizers is effected for the purpose of largely binding the dust while retaining its free flowing characteristics. This method results in a reduction in dust formation but does not eliminate it. This is particularly so in the case of lead salts of fatty acids which still show relatively serious dust formation even when treated with 3 to 5 parts of plasticizer. The use of lead stabilizers which have been converted into a pasty form by means of plasticizers is accompanied by difficulties with automatic dosing equipment due to the fact that pasty materials are difficult to dose.

Liquid lead stabilizers, i.e. high-percent solutions of lead salts in suitable solvents, would avoid the disadvantages mentioned above and, in addition, exhibit the advantages of known liquid barium, cadmium and zinc stabilizers as regards freedom from contaminations.

Lead octoate and lead naphthenates dissolved in organic solvents are, for example, known as driers for use in paints and varnishes. However, these products have not been used widely as stabilizers for halogen-containing resins because octoates have no lubricating action and are substantially more expensive than lead salts of fatty acids and inorganic acids and because naphthenates can only be used in exceptional cases due to their inherent color, their odor and their varying composition. In particular, the non-uniform lubricating characteristics of naphthenic acids from different sources prevent their use as stabilizers and lubricants.

It is an object of this invention to provide liquid lead stabilizers which possess substantially the requirements of an effective liquid stabilizer in that they combine high efficiency as thermal stabilizer, satisfactory lubricating action and dosability. This object is met in general by providing a lead stabilizer which is a combination of several components acting synergistically to give a particularly high activity.

It is another object of this invention to provide a liquid lead stabilizer composition for vinyl chloride polymers and copolymers, said composition comprising an alkyl phenol and a lead compound being soluble in said alkyl phenol, said lead compound being selected from the group consisting of a lead salt of an epoxidized fatty acid, a lead salt of a branched aliphatic carboxylic acid, a lead salt of a naphthenic acid, a lead alkyl phenolate, and mixtures thereof.

In the stabilizers according to the invention, the alkyl phenol itself may be the sole solvent present, as in the case where 2-isopropyl phenol, 2-methyl-4-tert. propyl phenol, 2,4-dimethyl phenol, 2,5-dimethyl phenol or p-nonyl phenol are used as alkyl phenols. However, the activity of the stabilizer may with advantage be increased still further by the presence of an organic solvent which acts synergistically. Preferred organic solvents for this purpose are plasticizers or stabilizers for polyvinyl chloride or vinyl chloride copolymers. Other very suitable organic solvents are the so-called mineral oil extenders, particularly those having high naphthene and paraffin contents.

The lead compounds of the first group used in accordance with the invention, i.e. lead salts of epoxidized fatty acids, have the advantage over lead salts of saturated or unsaturated fatty acids of being substantially more readily solube in alkyl phenol and other solvents or plasticizers compatible with halogen-containing polymers. Due to this fact, high percent solutions of lead salts of epoxidized fatty acids can be prepared. For example, while lead stearate is soluble in the technical-grade mixture of 2,4- and 2,5-dimethyl phenol to the extent of 1% only, lead epoxy stearate has a solubility of 70%.

Suitable epoxy fatty acids for the preparation of the lead salts of epoxy faty acids used in accordance with the invention are those which may be prepared by known methods by epoxidation of the ethylene linkage or linkages of naturally occurring unsaturated fatty acids such as oleic acid, palmitoleic acid, ricinoleic acid, linoleic acid.

The second group of lead compounds suitable for the preparation of the liquid lead stabilizers of the invention comprises the lead salts of branched chain aliphatic carboxylic acids, for example aplha ethyl hexanoic acid, alpha methyl heptanoic acid, alpha methyl valeric acid, isononaoic acid, or the corresponding beta branched acids, on the one hand, and lead salts of synthetic, highly branched or cyclic aliphatic carboxylic acids having from 9 to 19 carbon atoms and preferably 9 to 11 carbon atoms on the other hand. These synthetic acids which are also referred to as Koch acids and are obtained by addition of carbon monoxide and water to higher olefins are described, for example, in German Patent 942,987 or in "Fette, Seifen, Anstrichmittel," vol. 59, 493–498 (1957). The lead salts of these last-mentioned acids, similar to the lead salts of epoxidized fatty acids, are distinguished by high solubility in plasticizers, solvents or additives for halogen-containing polymers. They also have a substantially higher solubility than the known lead octoate. For example, lead octoate dissolves in chlorinated paraffin containing 40% chlorine to the extent of 20% while the lead salt of a $C_9$–$C_{11}$ Koch acid has a solubility of as high as 90%. A particular advantage of the lead salts of these synthetic short-chain acids resides in the possibility of improving still further the solubility of lead salts of epoxidized fatty acids when combinations of the former with the latter are used. Accordingly, the viscosity of a combination of lead epoxy stearate and the lead salt of a synthetic short-chain fatty acid does not reach the average value of the individual components but is lower than this value. The viscosity of a 70% lead epoxy stearate solution in a technical grade mixture of 2,4- and 2,5-dimethyl phenol is about 5,710 centipoises and that of a 70% solution of the lead salt of the $C_9$–$C_{11}$ Koch acid is 1,598 centipoises. However, the viscosity of a 1:1 mixture of the two components is only 1,496 centipoises. All of these values have been measured in a rotary viscosimeter at a speed of 81 r.p.m.

Finally, the known lead naphthenates and lead alkyl phenolates may be used as lead compounds in combination with the alkyl phenols mentioned above. The lead alkyl phenolates are preferably derived from the same alkyl phenols which are used as the liquid base component of the lead stabilizers of the invention.

The suitable relative proportion of the different lead compounds, alkyl phenols and, if desired, other organic additives may be determined by known methods.

When the optimum ratio of the lead compounds to alkyl phenols or to further additions has been established from these studies, the desired viscosity can be obtained by adding suitable solvents which are compatible with polyvinyl chloride or vinyl chloride copolymers.

The stabilizing characteristics of the combinations of the invention can be improved by adding thereto various hydroxyl-containing aliphatic compounds such as aliphatic saturated and unsaturated polyalcohols or alkanolamines having at least two hydroxyl groups, partial esters or ethers thereof having at least one free hydroxyl group. Examples of such compounds include ethylene glycol, glycerine, glycerine monooleate, ethylene glycol diethyl ether, propylene glycol, hexylene glycol, hexynediol and triethanolamine. Further suitable additives are epoxy compounds of glycerides or other esters of unsaturated fatty acids such as epoxidized soya bean oil. Other suitable compounds for improving the stabilizing characteristics of the stabilizers according to the invention include the phosphite compounds known per se, e.g. non-volatile triesters of phosphorous acid having the general formula

wherein the groups R, which may be the same or different, represent alkyl or aryl groups. Examples of such compounds include triphenyl phosphite, monooctyl diphenyl phosphite, trioctyl phosphite and monooctyl propylene glycol phosphite.

The stabilizers according to the invention are preferably prepared by dissolving the particular lead salts of organic acids in the alkyl phenols with heating to about 100 to 130° C. After completion of the dissolution process, other components of the mixture may be added.

In order that the invention may be more fully understood, the following examples are given by way of illustration only. These examples illustrate the preparation of the stabilizers according to the invention and their effectiveness in polyvinyl chloride compositions.

The liquid lead stabilizers described below were prepared by the following method.

The solid components were slowly heated with the alkyl phenol to about 120° C. with stirring. The remaining amount of liquid was added in portions and heating was continued until complete dissolution was reached. The solution was filtered through a fine-meshed sieve at about 50° C. to remove undissolved constituents such as metal hydroxide or carbonate and the like.

*Example 1*

| | Parts |
|---|---|
| Lead epoxy stearate | 8 |
| Lead salt of Koch acid of $C_9$–$C_{11}$ | 4 |
| 2,4; 2,5-dimethyl phenol | 8 |

Pb content, 18.4%; viscosity, 996 cp. (20° C.).

*Example 2*

| | Parts |
|---|---|
| Lead salt of $C_9$–$C_{11}$ Koch acid | 1.6 |
| 2,4; 2,5-dimethyl phenol | 0.4 |

Pb content, 28%; viscosity, 6921 cp. (20° C.).

*Example 3*

| | Parts |
|---|---|
| Lead octoate | 13.8 |
| 2,4; 2,5-dimethyl phenol | 3.2 |
| A high boiling petroleum fraction principally composed of paraffinic and naphthenic hydrocarbon fractions | 4.25 |

Pb content, 28.8%; viscosity, 78 cp. (20° C.).

*Example 4*

| | Parts |
|---|---|
| Lead naphthenate, acid No. 180 | 1.6 |
| 2,4; 2,5-dimethyl phenol | 0.4 |

Pb content, 20.3%; viscosity, 357 cp. (20° C.).

*Example 5*

| | Parts |
|---|---|
| Lead epoxy stearate | 8 |
| Lead naphthenate (acid No. 180) | 4 |
| Nonyl phenol | 8 |
| A high boiling petroleum fraction principally composed of paraffinic and naphthenic hydrocarbon fractions | 8.55 |

Pb content, 11.2%; viscosity, 1220 cp. (20° C.).

*Example 6*

| | Parts |
|---|---|
| Lead epoxy stearate | 8 |
| Lead octoate | 4 |
| 2,4; 2,5-dimethyl phenol | 8 |

Pb content, 18.1%; viscosity, 1416 cp. (20° C.).

*Example 7*

| | Parts |
|---|---|
| Lead epoxy stearate | 2.66 |
| Lead salt of Koch acid of $C_9$–$C_{11}$ | 1.33 |
| Lead naphthenate | 5.33 |
| Lead octoate | 4.17 |
| 2,4; 2,5-dimethyl phenol | 5.06 |
| A high boiling petroleum fraction principally composed of paraffinic and naphthenic hydrocarbon fractions | 1.33 |

Pb content, 22.3%; viscosity, 639 cp. (20° C.).

*Example 8*

| | Parts |
|---|---|
| Pb isononate | 6 |
| 2,4-dimethyl-6-tert. butylphenol | 2 |
| Epoxidized soyabean oil | 2 |

Pb content, 23.05%; viscosity, 2860 cp. (20° C.).

*Example 9*

| | Parts |
|---|---|
| Lead salt of Koch $C_{15}$–$C_{19}$ acid | 5.6 |
| Dodecyl phenol | 1.4 |
| A high boiling, aromatic-free petroleum fraction | 3.0 |

Pb content, 15.4%; viscosity, 126 cp. (20° C.).

*Example 10*

| | Parts |
|---|---|
| Lead salt of Koch $C_{15}$–$C_{19}$ acid | 5.6 |
| Dodecyl phenol | 1.4 |
| A high boiling solvent comprising mainly isoparaffinic petroleum fractions | 3.0 |

Pb content, 15.4%; viscosity, 86 cp. (20° C.).

The stabilizers of the invention are usually incorporated in vinyl chloride polymers and copolymers in an amount of from 0.5 to 10 parts and preferably from 0.5 to 2 parts per 100 parts of polymer. To illustrate their stabilizing action, 2 parts of each of the liquid stabilizer compositions listed in Examples 1 to 10 were incorporated in a test mixture comprising 100 parts of suspension polyvinyl chloride having a K value of 70 and 50 parts of dioctyl phthalate within 10 minutes on a roll mill at 170° C. and plasticized. The test mixtures were then drawn out to films and test samples were subjected to 180° C. in an oven having natural air circulation. The period of time elapsed until discoloration from colorless to yellow-brown occurred was determined by removing test samples at intervals of 10 minutes.

The same compositions were subjected to continuous milling at 170° C. on a roll mill, the rolls of which were running in the same direction. At intervals of 10 minutes, the time when sticking to the rolls or discoloration occurred was determined on test specimens taken. The time which elapsed before the composition stuck to the roll was a measure of the lubricating characteristics of the mixture.

| Example | Heat Stability, Minutes | Milling Stability, Minutes |
|---|---|---|
| 1 | 60 | 35 |
| 2 | 70 | 0 |
| 3 | 65 | 9 |
| 4 | 70 | 38 |
| 5 | 50 | 59 |
| 6 | 55 | 35 |
| 7 | 60 | 18 |
| 8 | 80 | 24 |
| 9 | 60 | 14 |
| 10 | 50 | 12 |

What is claimed is:

1. A liquid lead stabilizer composition comprising a solution of a major proportion of at least one lead salt of one member selected from the group consisting of an epoxidized fatty acid, Koch acids consisting of a mixture of branched, cyclic and straight-chain aliphatic monocarboxylic acids of 9 to 19 carbon atoms, an alkyl phenol in which the alkyl group has 1 to 12 carbons, and a naphthenic acid dissolved in a minor proportion of an alkyl phenol in which the alkyl group has 1 to 12 carbon atoms.

2. A liquid lead stabilizer composition comprising a solution of a major proportion of at least one lead salt of one member selected from the group consisting of an epoxidized fatty acid, Koch acids consisting of a mixture of branched, cyclic and straight-chain aliphatic monocarboxylic acids of 9 to 19 carbon atoms, and a naphthenic acid dissolved in a minor proportion of an alkyl phenol in which the alkyl group has 1 to 12 carbon atoms.

3. The composition of claim 2 in which the epoxidized fatty acid is an epoxidized higher fatty acid of 16 to 18 carbon atoms.

4. The composition of claim 2 which comprises a plasticizer for vinyl chloride polymers.

5. The composition of claim 4 in which the plasticizer is an epoxidized fatty acid ester.

6. The composition of claim 2 in which the Koch acids have 9 to 11 carbon atoms.

7. The composition of claim 2 in which the Koch acids have 15 to 19 carbon atoms.

8. The composition of claim 2 in which the epoxidized fatty acid is epoxy stearic acid.

9. The composition of claim 2 in which the alkyl phenol is dimethyl phenol.

References Cited by the Examiner

UNITED STATES PATENTS

| | | | |
|---|---|---|---|
| 2,684,353 | 7/1954 | Grenspan et al. | 260—23 X |
| 2,716,092 | 8/1955 | Leistner et al. | 252—400 X |
| 2,813,830 | 11/1957 | Trautman | 252—400 X |
| 2,912,397 | 11/1959 | Houska et al. | 260—23 X |
| 2,919,259 | 12/1959 | Naylor et al. | 260—45.75 |
| 2,921,917 | 1/1960 | Langman | 260—45.75 |
| 2,955,949 | 10/1960 | Kirshenbaum et al | 260—414 |
| 2,997,454 | 8/1961 | Leistner et al. | 260—23 X |

OTHER REFERENCES

The Condensed Chemical Dictionary, 6th ed., 1961 (pp. 416, 1234 relied on), QD 5 C 5.

"Stabilization of Polyvinyl Chloride," Lally et al., Modern Plastic, vol. 27, issue 4, pp. 111–112, 114, 116, 156–162 (1949).

LEON J. BERCOVITZ, Primary Examiner.

M. WEINBLATT, R. A. WHITE, Assistant Examiners.